United States Patent
Aakolk et al.

(10) Patent No.: US 8,001,521 B2
(45) Date of Patent: Aug. 16, 2011

(54) META-DATE DRIVEN IMPLEMENTATION OF BUSINESS OBJECTS AND THEIR TRANSACTIONAL BEHAVIOR

(75) Inventors: Michael Aakolk, Wiesloch (DE); Wolfgang M. Koch, Östringen-Odenheim (DE); Abhay A. Tiple, Sandhausen (DE)

(73) Assignee: SAP AG, Walldorf (DE)

( * ) Notice: Subject to any disclaimer, the term of this patent is extended or adjusted under 35 U.S.C. 154(b) by 1143 days.

(21) Appl. No.: 11/450,261

(22) Filed: Jun. 12, 2006

(65) Prior Publication Data

US 2007/0288891 A1   Dec. 13, 2007

(51) Int. Cl.
*G06F 9/44* (2006.01)
(52) U.S. Cl. ......... 717/106; 717/108; 717/115; 717/116
(58) Field of Classification Search .................. 717/101, 717/102, 106, 108, 116
See application file for complete search history.

(56) References Cited

U.S. PATENT DOCUMENTS

| | | | | |
|---|---|---|---|---|
| 5,390,330 | A * | 2/1995 | Talati | 717/104 |
| 6,018,627 | A * | 1/2000 | Iyengar et al. | 717/103 |
| 6,044,394 | A * | 3/2000 | Cadden et al. | 718/107 |
| 6,182,274 | B1 * | 1/2001 | Lau | 717/104 |
| 6,292,830 | B1 * | 9/2001 | Taylor et al. | 709/224 |
| 6,550,057 | B1 * | 4/2003 | Bowman-Amuah | 717/126 |
| 6,804,674 | B2 * | 10/2004 | Hsiao et al. | 1/1 |
| 6,931,623 | B2 * | 8/2005 | Vermeire et al. | 717/108 |
| 7,272,815 | B1 * | 9/2007 | Eldridge et al. | 717/101 |
| 7,350,191 | B1 * | 3/2008 | Kompella et al. | 717/108 |
| 7,367,025 | B1 * | 4/2008 | Nikolov et al. | 717/158 |
| 7,426,723 | B1 * | 9/2008 | Nikolov | 717/151 |
| 7,487,512 | B2 * | 2/2009 | Brunswig et al. | 719/318 |
| 7,506,315 | B1 * | 3/2009 | Kabadiyski et al. | 717/128 |
| 7,644,395 | B1 * | 1/2010 | Frey et al. | 717/128 |
| 2003/0058277 | A1 * | 3/2003 | Bowman-Amuah | 345/765 |
| 2003/0120824 | A1 * | 6/2003 | Shattuck et al. | 709/313 |
| 2003/0229884 | A1 * | 12/2003 | Carr et al. | 717/101 |
| 2006/0184410 | A1 * | 8/2006 | Ramamurthy et al. | 705/8 |
| 2006/0206866 | A1 * | 9/2006 | Eldrige et al. | 717/122 |
| 2007/0168949 | A1 * | 7/2007 | Shattuck et al. | 717/115 |
| 2007/0250840 | A1 * | 10/2007 | Coker et al. | 719/320 |
| 2008/0046433 | A1 * | 2/2008 | Kool-Brown et al. | 707/9 |

OTHER PUBLICATIONS

Title: Business template generation for supporting collaborative design works in mould companies, author: Cho et al, source: IEEE, dated: May 24, 2005.*
Title: Automatic generation and integration of RosettaNet based on generic templates and componentsm, author: Shim et al, source: IEEE; dated Jun. 26, 2002.*

* cited by examiner

*Primary Examiner* — Chameli C Das
(74) *Attorney, Agent, or Firm* — Mintz, Levin, Cohn, Ferris, Glovsky & Popeo, P.C.

(57) ABSTRACT

Systems, methods and computer readable media are provided for the creation of a business object. In one exemplary embodiment, the method may include defining the shell of a business object utilizing meta-data stored within a repository. The method may also include storing the defined business object shell within the repository. Moreover, the method may include generating a business object template utilizing the business object shell, meta-data, and hooks for calling generic business logic, and modifying the hooks to insert the generic business logic.

20 Claims, 6 Drawing Sheets

META-DATE DRIVEN IMPLEMENTATION OF BUSINESS OBJECTS AND THEIR TRANSACTIONAL BEHAVIOR

FIELD OF THE INVENTION

The present invention generally relates to data processing. More particularly, the present invention relates to systems and methods for implementing business objects and their transactional behavior using meta-data.

BACKGROUND OF THE INVENTION

There is, and will continue to be, advances and changes in how enterprises conduct business. Whether theses advances and changes occur through growing competition and globalization, mergers and acquisition, or a revamping of business models, the key for success will often depend on how quickly the enterprise's information technology (IT) organization can adapt to evolving business needs. Therefore, a major challenge to these enterprises is how they handle these changes from an IT standpoint.

For IT organizations to enable business agility, they must ensure that enterprise applications are not only high-performance business engines driving efficiencies, but also that they become flexible building blocks of future business systems. One solution to achieve this goal is the use of a Service Oriented Architecture (SOA). SOA refers to a software architectural framework that encourages the creation of loosely coupled services that communicate and pass information between the applications or modules. An implementation example of an SOA is the Enterprise Service Architecture (ESA) developed by SAP AG of Walldorf, Germany. In particular, the ESA is implemented through NetWeaver, an integration and application platform, also developed by SAP AG. Other examples of SOA enabling platforms are NET developed by Microsoft and Web Sphere developed by IBM.

Specific examples of the loosely coupled services used within an SOA are services. A service, such as a Web service, represents a self-contained, self-describing piece of application functionality that can be found and accessed by other applications. A service is self contained, because the application using the service does not have to depend on anything other than the service itself, and self-describing, because all the information on how to use the service can be obtained from the service itself. The descriptions are centrally stored and accessible through standard mechanisms to all applications that would like to invoke the service.

Because services are generally granular in nature, services may be aggregated into enterprise services, which provide more meaningful building blocks for the task of automating enterprise-scale business scenarios. Enterprise services allow IT organizations to efficiently develop composite applications, defined as applications that compose functionality and information from existing systems to support new business processes or scenarios. Enterprise services may communicate using standard mechanisms, can be described in a central repository, and are created and managed by tools provided by the application platform. The repository may be used to store all relevant pre-existing enterprise services and to make them available to selected partners and customers.

An invocation of a service or enterprise service typically involves the service's interaction and manipulation of data, specifically data in the form of business objects, stored within a repository or database, such as a enterprise service repository. The term business object when used in SOA represents a physical or logical object of significance to a business, such as a sales order. The description and creation of a business object may be accomplished through the use of meta-data. Meta-data is data that describes other data. For the most part, the creation of a business object using meta-data is done manually, and therefore, requires a great deal of time and resources.

In some systems meta-data is used to create only the shell (e.g., the look and layout) of the business object. As a result, the business object contains no real business logic. Generally, business logic refers to a set of methods or procedures used to manage a business function. For example, business logic may be used to check the transactional data of a business object before that transactional data is stored in a persistent database. In other words, business logic refers to the set of business-specific rules that help identify the structure and behavior of the business object, along with the pre- and post-conditions that must be met when a business object exposes its behavior to other objects in the system. Because in the above system the business object lacks any real business logic, a developer or user of the business object will have to manually create the business logic. Further, a developer will have to manually locate places within the business object that require business logic.

In other systems, there is some automatic generation of logic for a business object. However, in those systems the logic that is generated is limited to buffer logic. Buffer logic refers to methods and procedures used to manage the database access and the state handling of a business object. The buffer logic generated in these systems is generic buffer logic. Generic buffer logic refers to logic that allows database access and state handling operations to be performed in the same way irrespective of the business object that is involved. The development of business objects may be facilitated by centrally storing the generic buffer logic and allowing access to developers. However, as in the previously discussed system, this system would also require a developer to manually create the business logic that pertains to the business object and manually locate the places within the business object that require business logic.

Accordingly, there is a need to utilize meta-data, with little or no human interaction, to create not only the shell of a business object, but also a business object template for the implementation of the business object. This may be accomplished through the use of an adapter that utilizes business object meta-data previously stored in a repository of the enterprise. The business object template may provide a business object that is ready to run, with hooks indicating where business logic may be added. A developer may utilize these hooks to modify the business object in order to provide the additional business logic. Thus, the technical work of knowing wherein to add the business logic is provided by the adapter through the hooks of the business object template.

SUMMARY

In accordance with principles of the present invention, as embodied and broadly described herein, methods, systems, and computer program products are provided for the creation of generic business logic through the utilization of meta-data.

According to one embodiment, a method is provided for creating a business object. The method may comprise defining the shell of a business object utilizing meta-data stored within a repository, storing the defined business object shell within the repository, generating a business object template utilizing the business object shell, meta-data, and hooks for calling generic business logic, and modifying the hooks to insert the generic business logic.

In another aspect of the invention, a computer-readable medium containing instructions to configure a processor to perform a method of creating a business object is disclosed. The computer-readable medium may include instructions for defining the shell of a business object utilizing meta-data stored within a repository, storing the defined business object shell within the repository, generating a business object template utilizing the business object shell, meta-data, and hooks for calling generic business logic, and modifying the hooks to insert the generic business logic.

In another aspect of the invention, a system for creating a business object is disclosed. The system may comprise a processor and a memory, wherein the processor and the memory are configured to perform the method of defining the shell of a business object utilizing meta-data stored within a repository, storing the defined business object shell within the repository, generating a business object template utilizing the business object shell, meta-data, and hooks for calling generic business logic, and modifying the hooks to insert the generic business logic.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Overview

At present, the development of a business object requires the manual creation and design of the business logic contained within the business object. This development not only includes the creation of specific business logic pertaining to specific business functions for a particular business object, but also knowing all the locations where specific business logic is needed. However, as will be further disclosed in the present invention, there exists generic locations within a business object for the placement of certain generic business logic.

The existence of these generic locations may be explained further by using a sales order as an exemplary embodiment of a business object. As discussed above, meta-data may be used to create the shell (e.g., the look and layout) of a sales order. However, in order to define the business functions of the sales order, such as how data is inputted to the sales order, how data is manipulated, and how and where data is saved, business logic is needed. At present, this business logic is developed manually by a developer. In the development of a software application, a developer is generally dealing with multiple types of business objects, such as sales orders, invoices, business partners, and the like. For each of these business objects, the developer must generate different business logic. The business logic generated will be different from business object to business object because of the type of business object, and/or the specific client requirements for that business object. This type of business logic is herein referred to as "specific business logic." However, there exists some similarity within a business object concerning where certain business logic is needed. The similarity is a result of the fact that certain business functions should be performed at certain points during a transaction involving the business object. For example, business logic that performs the checking of data associated with a transaction (referred to herein as "transactional data") of a business object for completeness, plausibility, and/or consistency is generally performed after transactional data is retrieved.

Embodiments consistent with the present invention recognize this similarity and utilize previously existing meta-data, such as meta-data stored in a repository, to create a business object template that may aid a developer in the development of the business object.

The foregoing discussion is intended to introduce and provide initial clarity for some of the aspects associated with the present invention. Further details of the above-mentioned functionality and additional aspects, features, and embodiments of the present invention are described below.

Exemplary System Environment

Figure 1:
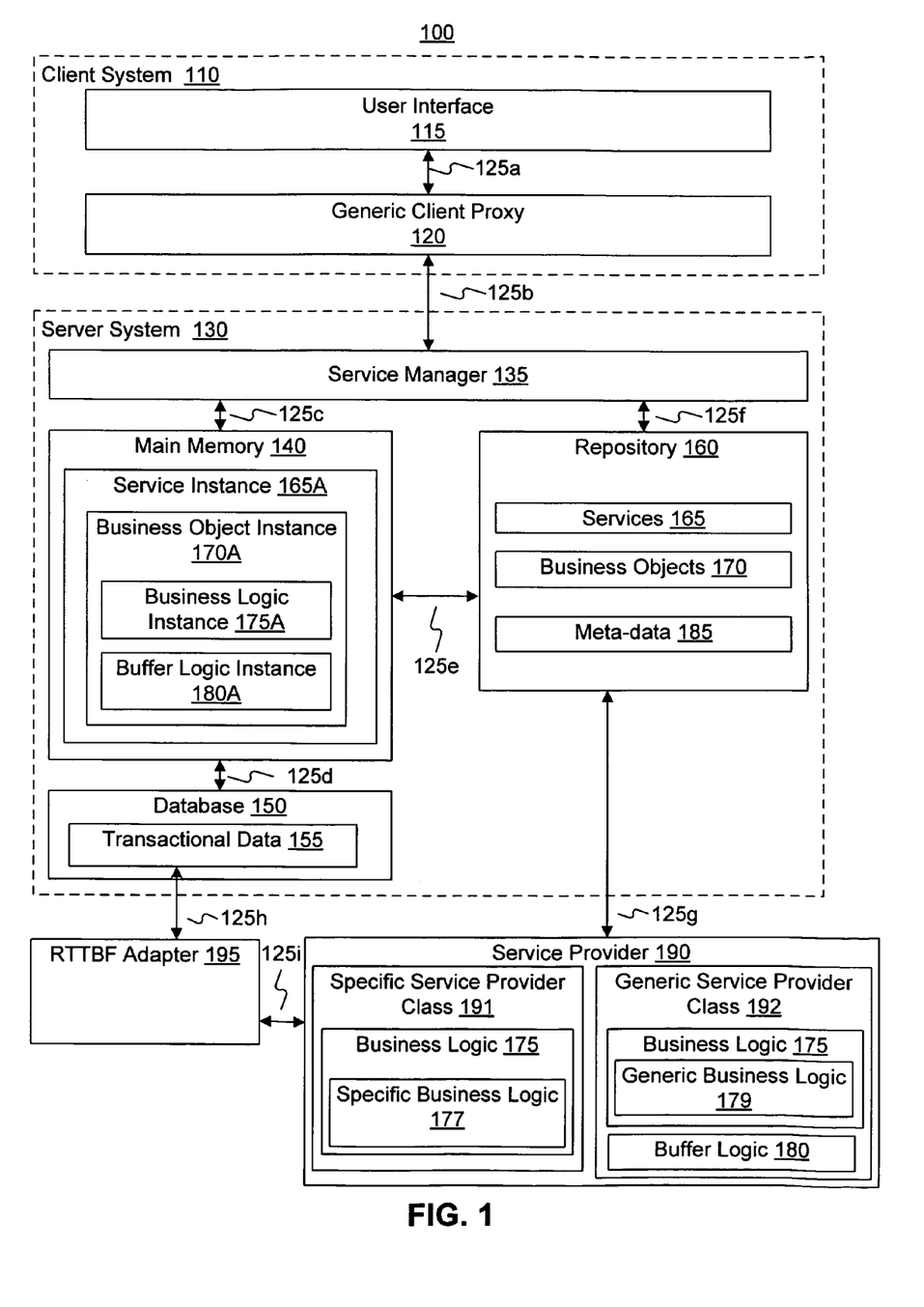
FIG. 1 illustrates a block diagram of an exemplary system environment, consistent with certain aspects related to the present invention.

FIG. 1 illustrates a block diagram of an exemplary embodiment of a services oriented system 100 that includes a front-end system depicted by client system 110, a back-end system depicted by server system 130, a service provider 190 and a runtime transaction buffer framework adapter 195.

System 100 may be implemented as part of a services oriented architecture (SOA), which as discussed above, is an architectural framework that is designed to include and utilize one or more services 165, although any other architectural framework may be used. The services 165 are accessible to other parts of the system 100, such as client system 110 and users of client system 110 by means of user interface 115 and through a communication mechanism, such as the Internet, intranet, or any other type of network. The services 165 may be retrieved from an external service provider 190 or may be stored internally within the repository 160.

Service provider 190 may be implemented as a server or storage device used by a service developer to store and share its developed services with others. Service provider 190 may also be implemented as a system for the development of a service by a developer. The developed services may be subsequently stored within the developing system, within repository 160, or within both. Service provider 190 may further be implemented as a service provider class, which may make use of other classes or other services. The service provider class provides services to run the business object. As used herein, "services to run the business object" refers to functions that interact with a business object, such as query, read, create, update, delete, associational retrieving actions, transactional services, and the like. Service provider 190 may have access to the data, tools, and logic stored within the repository 160 in order to facilitate the service provider 190 in the development of services 165. It should be noted, that although FIG. 1 shows a single client system 110, a single server system 130, and a single service provider 190, a plurality of client systems, server systems, and service providers may be used. Moreover, the components depicted in FIG. 1 may be distributed among multiple locations.

Further, service provider 190 may make the developed services available to other applications (or programs). These developed services may be made available as a service, such as a Web service or any other type of application accessible through a network.

Client system 110 may include one or more processors, such as computers, to interface with server system 130. User interface 115 may provide an interface to allow a user to interact with services 165 and business objects 170. For example, user interface 115 may be a software application that utilizes the functionality and data of services 165 stored in repository 160. In some implementations, SAP Web Dynpro (commercially available from SAP AG, Walldorf, Germany) is used as a model-based development environment for generating user interface 115, although other development environments may also be used. User interface 115 may call an application programming interface (API) of a proxy, such as generic client proxy 120 through network connection 125*a* to, for example, interact with available services 165 and business objects 170 via the service manager 135.

Network connections 125*a*-125*i* may include, alone or in any suitable combination, a telephony-based network, a local area network (LAN), a wide area network (WAN), a dedicated intranet, wireless LAN, the Internet, a wireless network, a bus, or any other communication mechanism. Further, any suitable combination of wired and/or wireless components and systems may provide network connections 125*a*-125*i*. Moreover, network connections 125*a*-125*i* may be embodied using bi-directional, unidirectional, or dedicated communication links. Network connections 125*a*-125*i* may also implement standard transmission protocols, such as Transmission Control Protocol/Internet Protocol (TCP/IP), Hyper Text Transfer Protocol (HTTP), Simple Object Access Protocol (SOAP), Remote Procedure Call (RPC), or other protocols.

Server system 130 may include one or more processors, such as computers, to interface with other computers, such as client system 110. Server system 130 may also include service manager 135, main memory 140, database 150, and repository 160. The repository 160 is the design-time repository of service objects for system 100. These service objects may include the services 165 themselves, business objects 170, and meta-data 185. Other design-time service objects, such as business logic 175 and buffer logic 180 are stored in service provider 190. In the embodiment wherein service provider 190 comprises a service provider class, service provider 190 may contain a specific service provider class 191 and a generic service provider class 192. Business logic 175 not only comprises specific business logic 177 stored in specific service provider class 19, but also may comprise a set of generic business logic 179 stored in generic service provider class 192. Generic service provider class 192 also stores buffer logic 180. This set of generic business logic 179 may be utilized by varying types of business objects 170. In this embodiment, buffer logic 180 is generic, in that it may also be used by varying types of business objects 170. However, buffer logic 180 may also contain buffer logic that is specific to a business object 170.

It should be noted that although repository 160 is illustrated as being located in server system 130, it may be alternatively located in a separate central system. Server system 160 may then access the repository 160 through the use of a proxy, and the actual implementation of the services by a service provider class.

Repository 160 also comprises meta-data 185, which is used as the building block for the other service objects. Meta-data may be defined as data about data. For example, meta-data may refer to information about the data itself, such as content, quality, condition, origin, size, formatting, characteristics of data, and the like. The eXtensible Markup Language (XML) is a specific example of meta-data because it is a format used to define other data objects. Meta-data may include a schema. A schema is the organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repository 160 as a schema. The schema can be depicted visually as a structure or a formal text-oriented description (e.g., script). For example, meta-data may be in the form of database tables. The meta-data may include information such as the number of nodes in a business object, the name(s) of the nodes, the position of a node in the business object hierarchy, the structure of a node, associations, actions, and default queries on a node.

Figure 2:
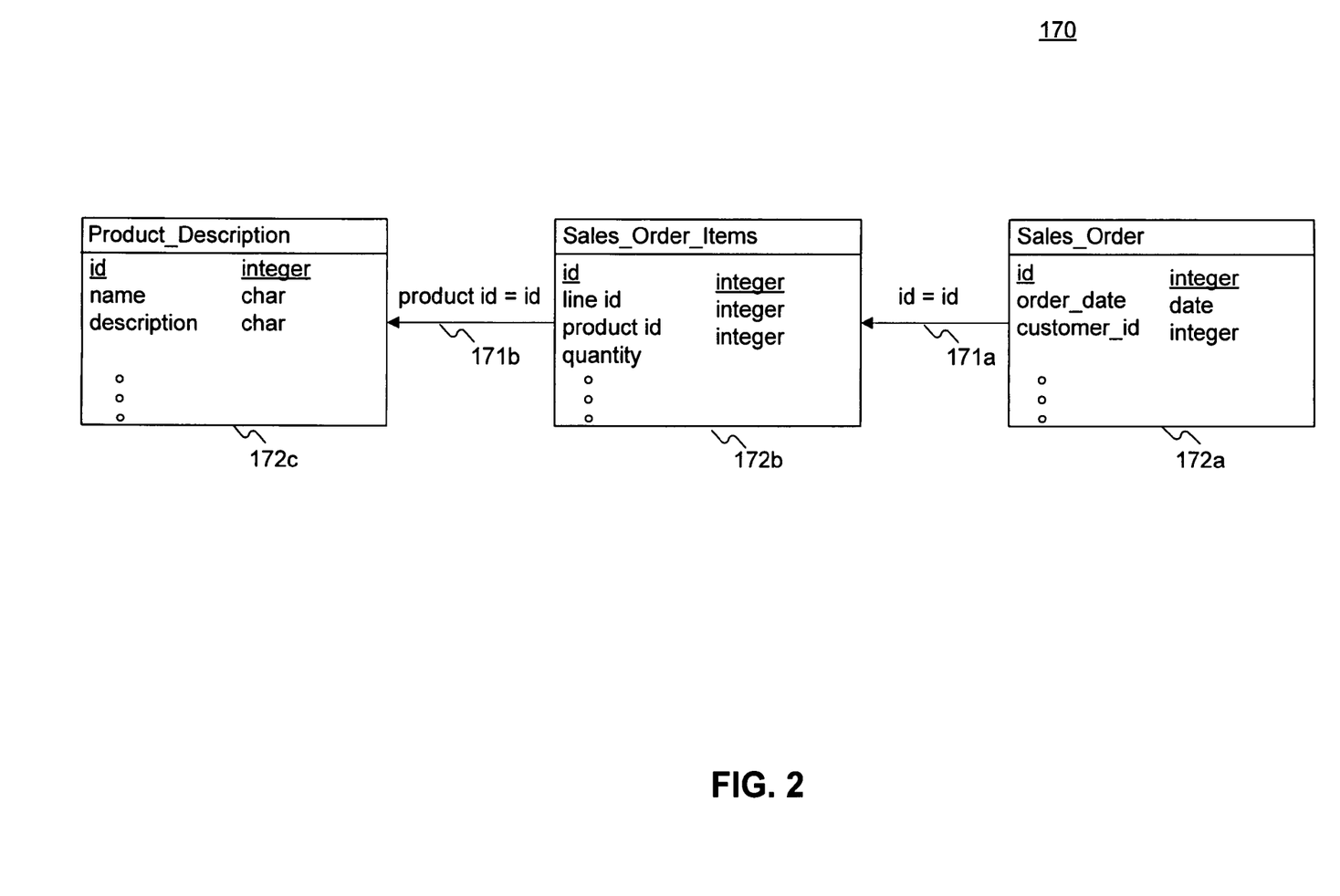
FIG. 2 illustrates an exemplary schema, consistent with certain aspects related to the present invention.

FIG. 2 illustrates an example of schema for a business object 170 stored within repository 160. As illustrated, business object 170 represents a sales order. The schema includes a business object node for a sales order 172*a*, sales order items 172*b* included with sales order 172*a*, and the corresponding product description 172*c*. Moreover, the schema depicted in FIG. 2 may include keys 171 that identify the relationships among the business object nodes 172. For example, key 171*a* is a sales order identification value ("id") that is used to link business object nodes 172*a* and 172*b*. Key 171*b* links the product identification values (labeled at FIG. 2 as "product id") of sales order item 172*b* to the product identification value (labeled "id") of product description 172*c*. The schema, which depicts business object nodes 172 and how they are associated to one another, may be considered meta-data and stored in repository 160. Moreover, the schema may be considered a "model" of how to implement these business object nodes 172. The model may serve as a template to enable the composition of other models for business objects and their nodes. The models may also be used to generate script for generating code for the business objects and their nodes. The schema may be stored as meta-data in repository 160.

Referring again to FIG. 1, repository 160 is open to input from many contributors, such as service provider 190, who may store or develop services 165 within the repository 160. Once in the repository 160, the services 165 may be available for reuse. Database 150 stores the transactional data 150 of the enterprise upon which the user interface 115 interacts via the functionality of services 165.

Using a software application capable of performing the function of supply chain management, as an non-limiting example of a user interface 115, an exemplary operation of a service call is discussed. A function of the supply chain management application may include the creation of a sales order and in turn, this functionality is represented by a service 165 that is stored in repository 160. In order for user interface 115 to retrieve this required service 165, generic client proxy 120 may call the API of service manager 135 at server system 130. When the API of service manager 135 is called, service manager 135 may call a procedure through an API to instantiate the required service 165. As used herein, the term "instantiate" means, in an object-oriented programming environment, deploying, customizing, running, and/or executing an application, function, or object. Also, as used herein the term "instance" means one or more copies of an application, function, or object that has been instantiated.

The service instance 165A is executed in main memory 140. Service 165 may in turn instantiate one or more business objects 170. In this exemplary embodiment, because a service 165 that utilizes a sales order is instantiated, a business object 170 that represents the sales order is also instantiated. The business object instance 170A is also executed in main memory 140. The business object instance 170A may comprise business logic instance 175A and buffer logic instance 180A. As discussed above, business logic 175 refers to the set of business-specific rules that help define the business functions of the business object, which in this case is a sales order, along with the pre- and post-conditions that must be met when an object exposes its behavior to other objects in the system. On the other hand, the buffer logic refers to methods and procedures to manage the access of business object 170 to the database 150 and the state handling of the business object 170 during the transaction. In this example, the business logic instance 175A comprises not only specific business logic 177, but also one or more generic business logic 179 from the set of generic business logic stored within service provider 190. Also, in this example, the buffer logic instance 180A comprises generic buffer logic 180, although specific buffer logic 180 may be utilized.

After creation of the service instance 165A, there may be an exchange of data and/or commands between the service instance 165A and the user interface 115 in order to perform the transaction of creating a sales order. For performance of the transaction, various access methods to database 150 is provided by generic client proxy 120 or a local client proxy (not illustrated), which may be called by user interface 115. For example, user interface 115 may require data regarding the existing inventory of the goods to be sold by the sales order. The data pertaining to the inventory may be stored as transactional data 155 in database 150. Generic client proxy 120 or the local client proxy may provide the method by which the inventory quantity is accessed and retrieved by the purchase order. The transactional data 155 may be held in main memory 140 during the performance of the transaction. After the sales order is completed, resultant transactional data 155, for example a reduction in inventory by the number of items sold by the sales order, is stored to database 150. Buffer logic instance 180A may perform state handling during the transactional event. For example, buffer logic instance 180 may perform the holding, locking, updating, inserting, and/or deleting of data within database 150 during the transactional event.

However, prior to the transactional data 155 being saved, business logic instance 175A, may be utilized to check the transactional data for completeness, plausibility, and/or consistency. Further, business logic instance 175A may enrich the transactional data 155 by adding additional information to the transactional data 155 before the data is saved in database 150. As used herein, "enrich" refers to the method of adding data that may be derived or calculated from other data. For example, the identity of a sales representative may be derived from the customer name and the geographic sales region of a particular sales transaction. The above set of methods and procedures are herein referred to as "check and enrich." The check and enrich business function is a business function that may be utilized by varying business objects 170. Therefore, the idea to have a method such as check and enrich is generic. However, the actual implementation of the check and enrich method is specific, since specific business logic 177 will be needed to perform the method. The specific business logic 177 utilized may depend, for example, on the type of business object. As a result, runtime transaction buffer framework (RTTBF) adapter 195 may create a business object template that is preconfigured with hooks that will call specific business logic 177 relating to the necessary method of check and enrich for the particular business object 170. As used herein, "hooks" refer to breakpoints within the logic that may be changed by a program developer to call other logic, such as business logic.

Generating Generic Business Logic

Figure 3:
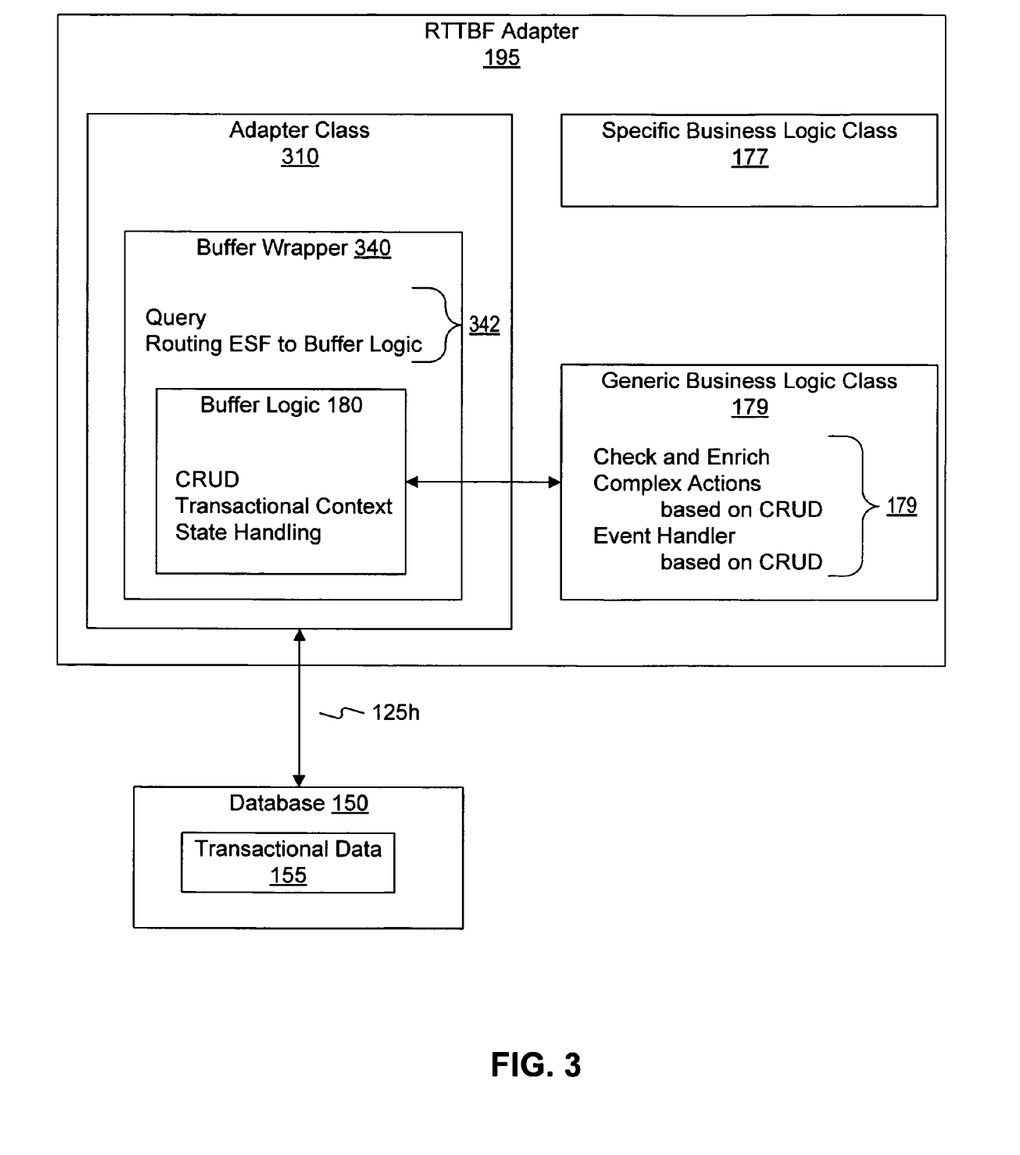
FIG. 3 illustrates a block diagram of an exemplary adapter for generating a business object template, consistent with certain aspects related to the present invention.

FIG. 3 illustrates a more detailed representation of the RTTBF adapter 195, the logic stored within, and the interaction of that logic with database 150. Logic within RTTBF adapter 195 may be organized into an adapter class 310, generic business logic class 179, and a specific business logic class 177. The adapter class 310 may include a buffer wrapper 340, which stores logic 342 and buffer logic 180.

Logic 342 may include generic logic that is performed by RTTBF adapter 195, but may not be a buffered method, because the logic circumvents all buffers. For example, the method "Query" is used to lookup business objects 170. That is Query may search all customers by name, employees by location, and the like. For the search to be effective, it is done directly in the persistent layer (i.e., database 150) and circumvents the buffer layer. The method entitled "Routing ESF to Buffer Logic" is used to route calls between the system 100 and RTTBF adapter 195. That is, a call from the service manager 135 may be made using an interface description that may be different from the interface of the RTTBF adapter 195. Therefore, the method Routing ESF to Buffer Logic provides routing and mapping from the language of the system 100 to the language of the RTTBF adapter 195.

Buffer logic 180, as discussed above, perform logic methods for database access operations that may be used by varying business objects 170. Examples of such buffer logic relate to functions pertaining to a transaction with database ("transactional context") 150, such as when a transaction creates, reads, updates, and/or deletes (referred to as CRUD) transactional data 155 in database 150 or any state handling of the transaction or database 150.

Functions of the transactional context may include functions, such as SELECT_BY_RELATION and REFRESH_BY_RELATION. SELECT_BY_RELATION may serve to access an instantiated business object 170 using one of its relations, and REFRESH_BY_RELATION may serve to refresh the data stored within an instantiated business object 170 using one of its relations. CRUD (create, update, retrieve, and delete) refers to the main methods that are needed for database access. These functions are related, in the sense of buffered operations, to Structured Query Language (SQL) methods. That is, Create is related to INSERT, Read to SELECT, Update to UPDATE, and Delete to DELETE. State handling refers to functions that may protect transactional data 155 stored in database 150 if multiple database access operations are requested simultaneously. For example, multiple buffer logic instances 180A may be created due to multiple service requests. These buffer logic instances 180A may attempt to perform data save operations for saving transactional data 155 in database 150 simultaneously. State handling functions may assure that writing transactional data 155 by one buffer logic instance 180A may be prevented if the data is being read by another buffer logic instance 180A. State handling functions may also restrict transactional data 155 from being read from database 150, if that data has already been loaded for use in a transaction by another buffer logic instance 180A.

The method 'INSERT' of buffer logic 180 may serve to create a new instance of a business object 170. The method 'UPDATE' may serve to update one or more data values of an already instantiated business object 170 stored in main memory 140. The method 'DELETE' of buffer logic 180 may serve to delete an instantiated business object 170 that may be stored in main memory 140. The method 'SELECT' may serve to access an instantiated business object 170 stored in main memory 140 by means of its access key 171.

Inserted or updated data may be persistently written to database 150 by the method 'SAVE' of buffer logic 180. However, prior to data being saved, a hook may be used to call the generic business logic check and enrich stored in generic business logic class 179. As discussed above, the generic business logic check and enrich may check the transactional data 155 for completeness, plausibility, and/or consistency. Further, it may enrich the transactional data 155 by adding additional information to the transactional data 155.

Figure 4:
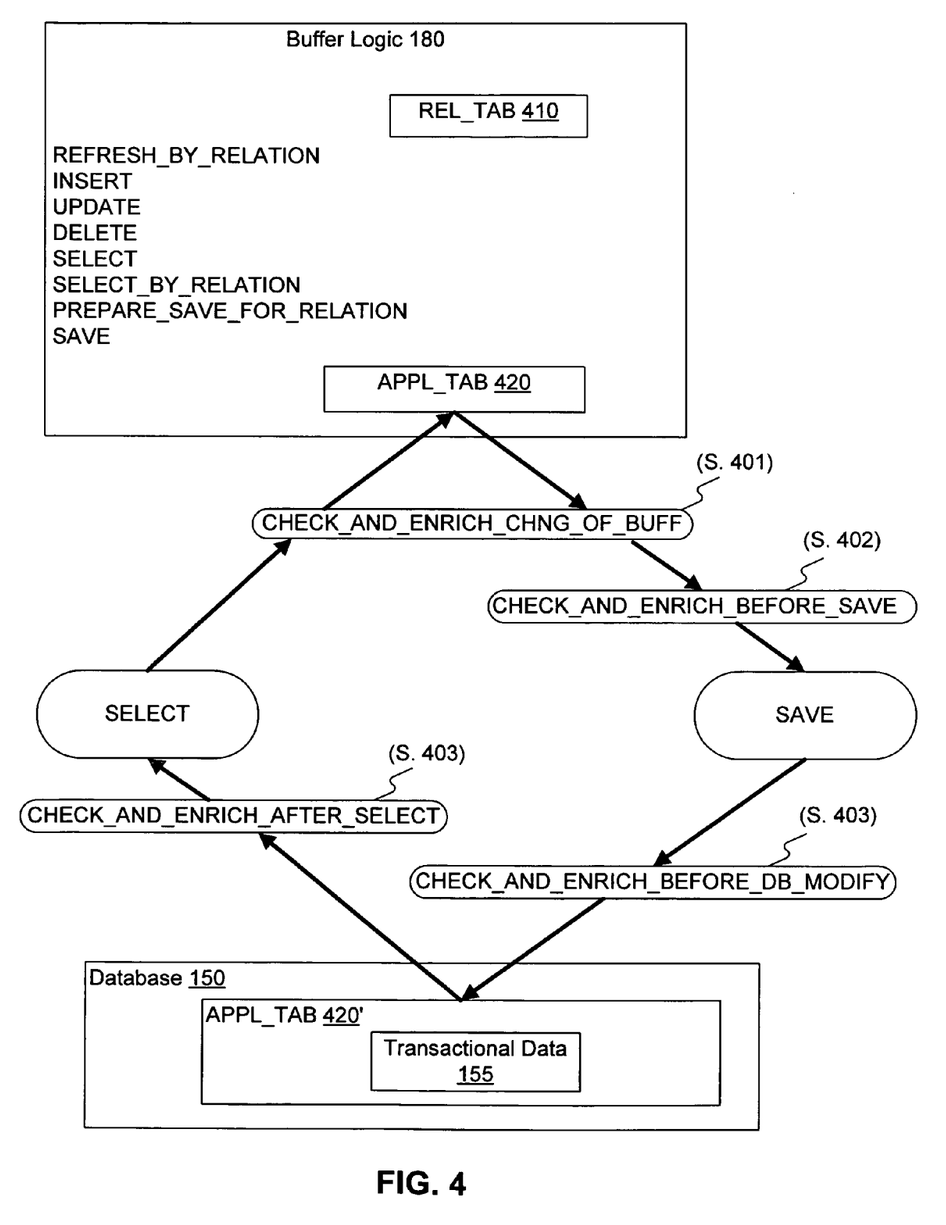
FIG. 4 illustrates a block diagram of an exemplary operation of buffer logic and business logic, consistent with certain aspects related to the present invention.

FIG. 4 illustrates exemplary locations within buffer logic 180 for placements of hooks to generic business logic 179. As illustrated, an instance of buffer logic 180 may comprise a relations table 410 (labeled "rel_tab") and an application or transactional data table 420 (labeled "appl_tab"). Relations table 410 and transactional data table 420 may be held in main memory 140. Relations table 410 may serve for storage of relationship information of business object instance 170A, and transactional data table 420 may serve for storage of transactional data of business object instance 170A. The use of relations table 410 and transactional data table 420 allows transactions to be performed on the data while limiting read/write operations to database 150. For example, if a business object 170 utilizes transactional data 155, instead of performing the transactional operation on the transactional data 155 stored in database 150, the transactional data 155 is first copied and stored in relations table 410 and/or transactional data table 420. The transaction operation is then performed on the copied transactional data stored in relations table 410 and/or transactional data table 420. After completion of the transaction, the transactional data 155 may be stored in the respective transactional data table 420' (labeled "app_tab") within database 150, provided that the data check performed by the generic check and enrich business logic resulted in an approval of the database access operation for storage of the transactional data 155.

The check of the transactional data 155 performed by the generic business logic check and enrich may be triggered by variety functions performed by buffer logic 180. As discussed above, the use of a method, such as check and enrich is generic, while the implementation may require specific business logic. Therefore, RTTBF adapter 195 places hooks within the transaction event at instances in which the check and enrich method may be called. For example, generic check and enrich hooks may be utilized whenever there is a change to the transactional data 155 in a buffered state stored at relations table 410 and/or transactional data table 420. This may occur, for example, when the buffer logic instance 180A performs the functions of INSERT, UPDATE, or DELETE on transactional data 155 stored within application data table 420 (S. 401). This may also occur when the buffer logic instance 180A performs the function of SELECT or SELECT_BY_RELATION on transactional data 155 stored within application data table 420 (S. 401). The generic check and enrich hook may also be inserted before the SAVE function is performed by buffer logic instance 180A (S. 402). In addition, after the SAVE function is performed to insert data to application table 420' and before database 150 is modified, a generic logic check and enrich hook may be inserted (S. 403). Further, after the SELECT function is performed to remove/copy data from application table 420' and before the data is stored in application data table 420 and/or elations table 410, a generic logic check and enrich hook may be inserted (S. 404).

Other generic business logic hooks that may be utilized by the present invention are complex actions based on CRUD and an event handler based on CRUD. In particular, actions are coarse granular changing operations, while CRUD is fine granular. For example, a CRUD update may include changing the address of an employee or changing the number of books to be ordered. On the other hand, an example of action may include booking a flight, where a lot of data could be created or changed, such as the flight data, the customer data, the booking data, etc. Further, actions may redirect these changes to the fine granular services of each object involved, such as UPDATE (e.g., to update the number of free airline seats) or CREATE (e.g., to create a passenger list).

As discussed above, state handling refers to the transactional state of each business object 170 involved in a transaction. However, system 100 may also include event handling. Event handlers are mainly used for cross business object 170 transactions. For example, when a business object sales order is changed, an event is triggered and other business objects 170, such as purchase orders may register this event, and thus, corresponding changes in the purchase order could be triggered by this event.

Figure 5:
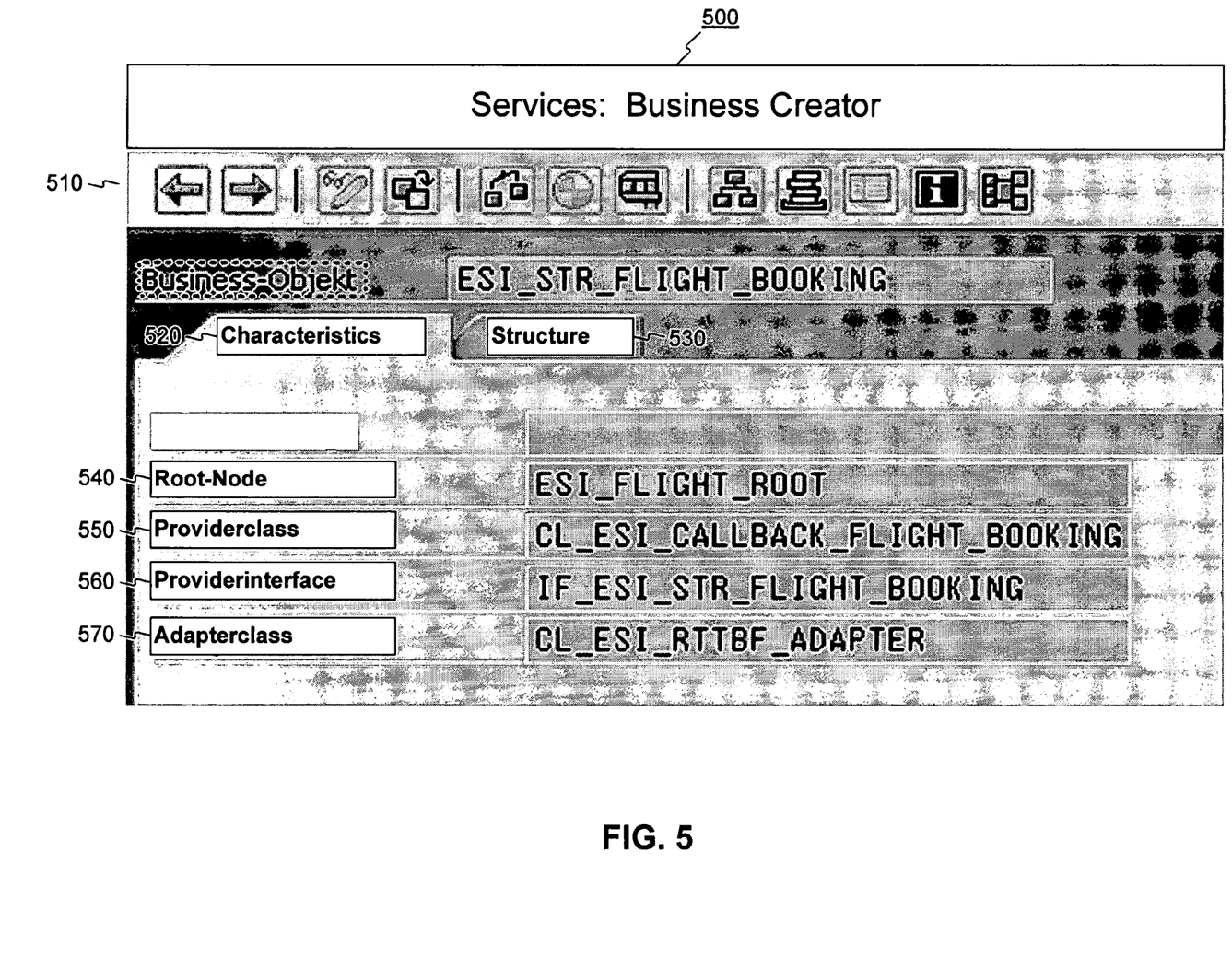
FIG. 5 illustrates a screenshot of an exemplary software application used to create a business object, consistent with certain aspects related to the present invention.

FIG. 5 illustrates a screen shot of exemplary software application 500 capable of aiding a developer in the development of business objects 170. The development of business objects 170 is done in two steps. First, meta-data to describe the business object 170 and its services is created on an abstract level in the repository 160. The meta-data is platform independent and may be stored using a data definition language, such as the Web Services Description Language (WSDL), WSDL++ (an SAP AG proprietary extension of WSDL), or XML. In order to provide a running business object 170, a development system 500 may be created using programming languages, such as ABAP workbench (developed by SAP AG) or the Java programming language (developed by Sun). The development system 500 may be connected to the repository 160, and thereby allows business object meta-data 185 to be downloaded as a proxy. Subsequently, specific data may be added, such as the name of the business object and the interfaces used. The further development of this business object must be done by the developer. However, using the RTTBF adapter 195, a running business object already exists. A developer may use the business object as is, or enhance the business object using the preexisting hooks.

As illustrated, development system 500 may include graphical user interface objects 510 to facilitate a developer in the navigation and operation of the development system 500. Through the selection of tab 530, development system 500 may aid a developer in the creation of the structure (i.e., shell) 530 of the business object 170. Through the selection of tab 520, development system 500 may aid a developer in the creation of a business function of the business object 170.

The business logic 175 used to define the business functions of the business object 170 are entered in data fields 540-570. The first data field 540, contains the root-node of the business object 170. The root node of a business object 170 refers to the business object node that may not have any parent node, but may have children nodes. All other nodes of a business object may form a tree of business object nodes with the root node as the root of the tree. A business object root node may contain key information of its associated business objects, such as the identification of the business objects, the names of the business objects, and the like. A business object may also contain queries that may return elements of its root node, and queries that may use the retrieved root node information to access other associated business object nodes.

The providerclass data field 550 includes specific business logic 177 that is manually generated by a developer or service provider 190. The specific business logic 177 provides specific business functions for the business object 170 that may be based upon variables, such as the type of business object 170, the functionality of the application calling the business object 170, and/or client requests.

The providerinterface data field 560 includes data types pertaining to the interface methods that are utilized by a particular service provider to interface with a business object 170. Typically, multiple service provider interfaces are provided, but for simplicity only one is illustrated. Further, the interface methods may be independent of the business object 170, however, as illustrated, there are also some interface methods that are specific to certain business objects 170.

The adapter class data field 570 includes the generic business logic 170 and buffer logic 180 provided by adapter class 310. In particular, a developer may automatically add the business functions provided by the RTTBF Adapter 195 with little need to develop or modify code.

Figure 6:
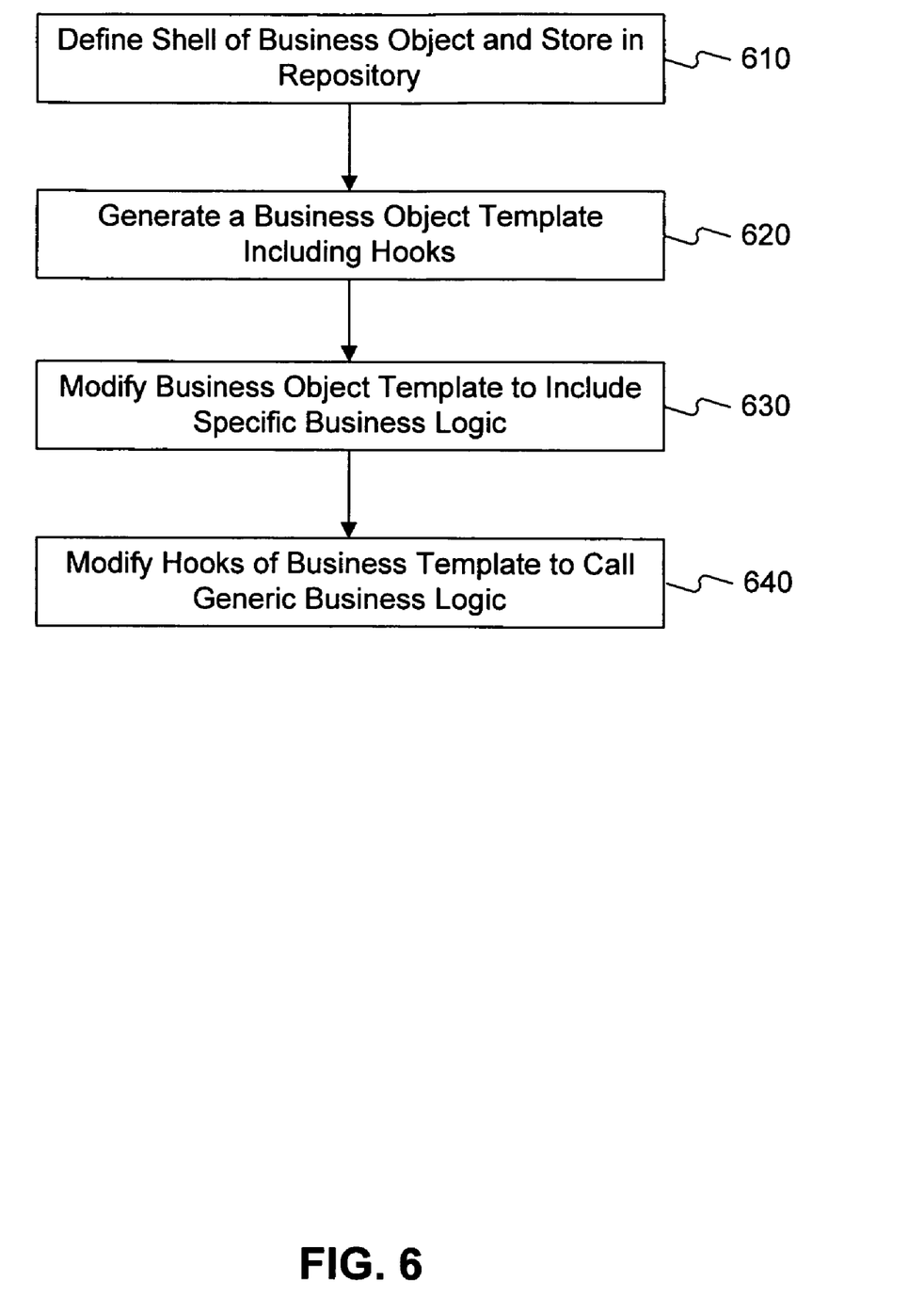
FIG. 6 illustrates a flowchart with exemplary steps for creating a business object, consistent with certain aspects related to the present invention.

FIG. 6 is a flowchart of exemplary steps for creating a business object 170. The process of creating a business object 170 may begin by using meta-data 180, stored within repository 160, to define the shell (e.g. look and layout) of a business object 170 (S. 610) The definition of the shell of the business object 170 may also be stored within repository 160 (S. 610). The repository 160 may be accessible to developers or service providers 190. Access to repository 160 may be limited based upon the level of business relationship with the entity responsible for maintaining the repository 160, based upon the payment or promised payment of a fee, or upon any contractual relationship. The repository 160 may also be accessible to all, or may be accessible to all after registration. The process of creating a business object 170 may also comprise generating a business object template utilizing the business object shell (S. 620). The business object template may include hooks for calling generic business logic 179 (S. 620). For example, the hooks may be used as a placeholder to call generic business function of performing checks of transactional data of a business object 170 for completeness, plausibility, and/or consistency. The generic business logic 179 may be stored within service provider 190.

The creation of a business object 170 may also involve the modification of the business object template to include specific business logic 177 (S. 630). Specific business logic 177 may be used, for example, to define a specific business function of a business object 170. For example, in the case of a sales order business object 170, the specific business function may define what department within an enterprise is to be credited with the proceeds from the sale of a specific item. The specific business logic 177 may be generated by a developer or service provider 190 and stored in service provider 190 (S. 630).

The creation of a business object 170 may further involve modifying the hooks included in the business object template to call generic business logic 179 (S. 640). The above may be combined to form a completed business object 170. Further modification of the business object template may also include the addition of buffer logic 180 used to define the methods and procedures used to manage the database 150 access and the state handling of the business object 170 during a transaction. Further, the modifications may be done manually or through the use of development software, such as the software illustrated in FIG. 5.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Further, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in or by means of the Java programming language, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited to examples described in the present specification or during the prosecution of the application. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method of creating a business object:
defining the shell of a business object utilizing meta-data stored within a repository;
storing the defined business object shell within the repository;
generating a business object template utilizing the business object shell and meta-data, wherein the business object template is preconfigured with one or more hooks to generic business logic placed in at least one location within buffer logic of the business object for calling one or more business functions usable by the business object and at least one other business object; and
modifying the one or more hooks to insert the generic business logic,
wherein the one or more hooks define one or more breakpoints in the buffer logic where the generic business logic may be inserted.

2. The method of claim 1, wherein the generic business logic is created by a service provider.

3. The method of claim 1, wherein the buffer logic for manages access of the business object to a database and a state handling of the business object during a transaction.

4. The method of claim 1, wherein the generic business logic is capable of checking transactional data of the business object and at least one other business object for consistency.

5. The method of claim 4, wherein the generic business logic is capable of enriching the transactional data by adding additional information to the transactional data.

6. The method of claim 1, wherein the generic business logic is capable of handling complex actions involving creating, reading, updating and/or deleting transactional data from a database.

7. The method of claim 1, wherein the generic business logic is capable of handling event handlers used for cross business object transactions.

8. A non-transitory computer-readable storage medium storing instructions to configure a processor to perform a method of creating a business object, the method comprising:
defining the shell of a business object utilizing meta-data stored within a repository;
storing the defined business object shell within the repository;
generating a business object template utilizing the business object shell, and meta-data, wherein the business object template is preconfigured with one or more hooks to generic business logic placed in at least one location within buffer logic of the business object for calling one or more business functions usable by the business object and at least one other business object; and
modifying the one or more hooks to insert the generic business logic,
wherein the one or more hooks define one or more breakpoints in the buffer logic where the generic business logic maybe inserted.

9. The non-transitory computer-readable storage medium of claim 8, wherein the generic business logic is created by a service provider.

10. The non-transitory computer-readable storage medium of claim 8, wherein the business logic manages access of the business object to a database and a state handling of the business object during a transaction.

11. The non-transitory computer-readable storage medium of claim 8, wherein the generic business logic is capable of checking transactional data of the business object and at least one other business object for consistency.

12. The non-transitory computer-readable storage medium of claim 11, wherein the generic business logic is capable of enriching the transactional data by adding additional information to the transactional data.

13. The non-transitory computer-readable storage medium of claim 8, wherein the generic business logic is capable of handling complex actions involving creating, reading, updating and/or deleting transaction data from the database.

14. The non-transitory computer-readable storage medium of claim 8, wherein the generic business logic is capable of handling event handlers used for cross business object transactions. database.

15. A system for creating a business object, comprising:
a processor; and
a memory, wherein the processor and the memory are configured to perform a method comprising:
defining a shell of a business object utilizing meta-data stored within a repository;
storing the defined business object shell within the repository;
generating a business object template utilizing the business object shell and meta-data, wherein the business object template is preconfigured with one or more hooks to generic business logic placed in at least one location within buffer logic of the business obiect for calling one or more business functions usable by the business object and at least one other business object; and
modifying the one or more hooks to insert the generic business logic,
wherein the one or more hooks define one or more breakpoints in the buffer logic where the generic business logic may be inserted.

16. The system of claim 15, wherein the generic business logic is created by a service provider.

17. The system of claim 15, wherein the buffer logic manages access of the business object to a database and a state handling of the business object during a transaction.

18. The system of claim 15, wherein the generic business logic is capable of checking transactional data of the plurality of business object and at least one other business obiect for consistency.

19. The system of claim 18, wherein the generic business logic is capable of enriching the transactional data by adding additional information to the transactional data.

20. The system of claim 15, wherein the generic business logic is capable of handling complex actions involving creating, reading, updating and/or deleting transaction data from a database.

* * * * *